United States Patent [19]

Kwang-Chien

[11] Patent Number: 4,880,968
[45] Date of Patent: Nov. 14, 1989

[54] OPTICAL INPUT CURSOR DEVICE USING OPTICAL GRID MEANS

[76] Inventor: Fong Kwang-Chien, 3F-2 No. 3, Alley 6, Lane 118, Sec. 1, Chung Yang Road, Tu Cheng Hsiang, Taipei Hsien, Taiwan

[21] Appl. No.: 328,731
[22] Filed: Mar. 23, 1989

Related U.S. Application Data

[63] Continuation of Ser. No. 64,250, Jun. 19, 1987, abandoned.

[51] Int. Cl.⁴ ............................................. G09G 3/02
[52] U.S. Cl. ................................... 250/221; 340/710
[58] Field of Search ............... 250/221, 237 G, 237 R; 340/706, 709, 710; 356/396

[56] References Cited

U.S. PATENT DOCUMENTS

| | | | |
|---|---|---|---|
| 4,409,479 | 10/1983 | Sprague et al. | 250/237 G |
| 4,546,347 | 10/1985 | Kirsch | 250/237 R |
| 4,564,835 | 1/1986 | Dhawan | 340/710 |
| 4,686,329 | 8/1987 | Joyce | 250/221 |
| 4,686,332 | 8/1987 | Greanias et al. | 340/706 |
| 4,751,380 | 6/1988 | Victor et al. | 340/710 |

*Primary Examiner*—David C. Nelms
*Assistant Examiner*—Stephone B. Allen
*Attorney, Agent, or Firm*—Lowe, Price, LeBlanc, Becker & Shur

[57] ABSTRACT

An optical input device which uses a reflection plane with horizontal and perpendicular lines to reflect light which is then amplified and transmitted by a lens and a reflector to a receiver with horizontal and perpendicular optical grids to receive light representing brightness and shadow and give signal for determination of distance and direction of displacement, and the signal is then processed by microprocessor to control movement of cursor or like in computer system.

1 Claim, 4 Drawing Sheets

OPTICAL INPUT CURSOR DEVICE USING OPTICAL GRID MEANS

This application is a continuation of application Ser. No. 064,250, filed June 19, 1987, and now abandoned.

BACKGROUND OF THE INVENTION

The present invention relates to an optical input device which applies transmission of light to sent signal representing direction and distance of displacement to a receiver with horizontal and perpendicular optical grids giving different signals in response to optical signals from displacement in horizontal and perpendicular directions for processing by microprocessor which in turn gives signal to computer for control on movement of cursor.

SUMMARY OF THE INVENTION

The present invention provides an optical input device composed of a light source, a reflection plane, a lens, a reflector, a receiver and an electronic signal processing system. It uses a reflection plane with horizontal and perpendicular lines to reflect light which is then amplified and transmitted by a lens and a reflectors to a receiver with horizontal and perpendicular optical grids to receive bright light and shadow and to give signals for determination of distance and direction of displacement. The signals are processed by microprocessor which sent signals to computer for control on movement of cursor or like.

DESCRIPTION OF THE PREFERRED EMBODIMENTS

Figure 1:
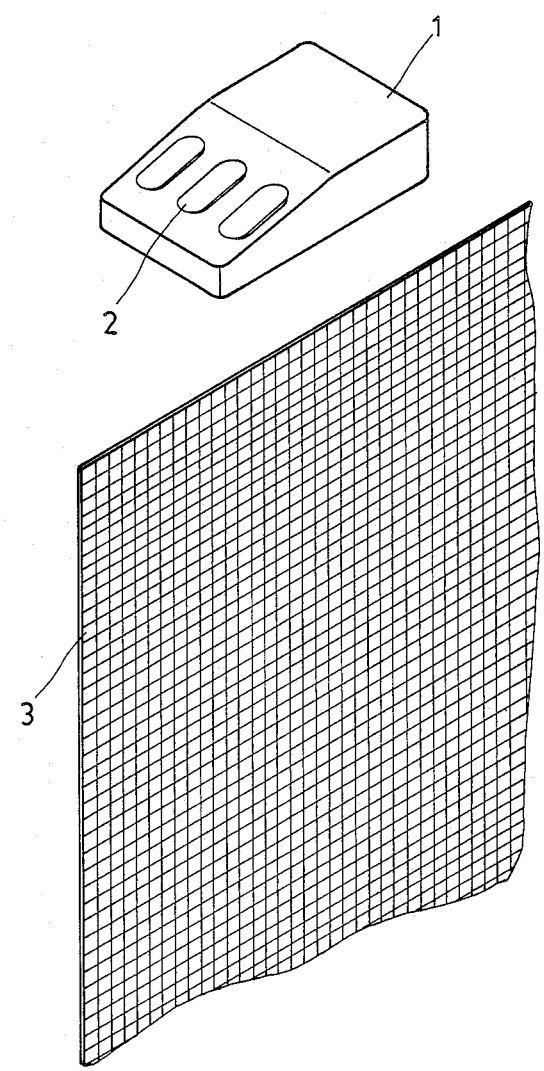
FIG. 1 illustrates use of the present invention.

FIG. 1 illustrates application of the present invention. It comprises of a casing (1) with function keys (2) on the top for function selection. Within the casing (1) there is a reflection plane (3) on which parallel lines in horizontal and perpendicular directions are designed. All of these parallel lines are of constant pitch and width in a definite ratio. In order to facilitate description, the longitudinal direction is designated as Y axis and the transverse direction is designated as X axis.

Figure 2:
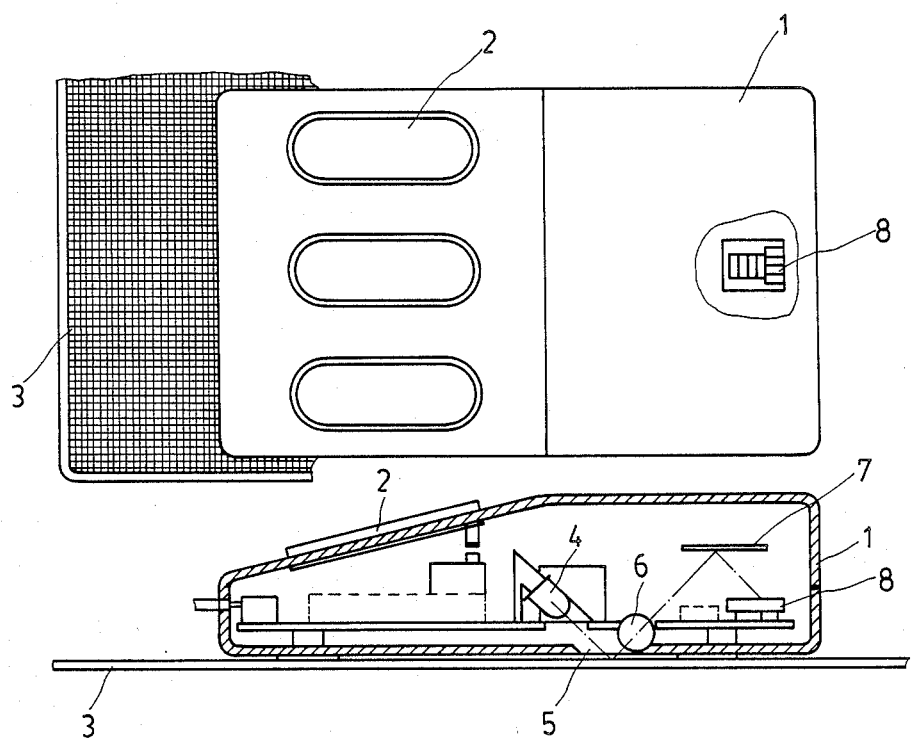
FIG. 2 is a top view and side cross sectional view of the present invention.

FIG. 2 is a top view and a side cross sectional view of the present invention. As shown in the drawing, light from LED, acting as a light source (4), is passing through a window (5) on the bottom of the casing (1) toward the reflection plane (3), reflected light from which is passing through a lens (6) and then reflected to a receiver (8) by a reflector (7).

Figure 3:
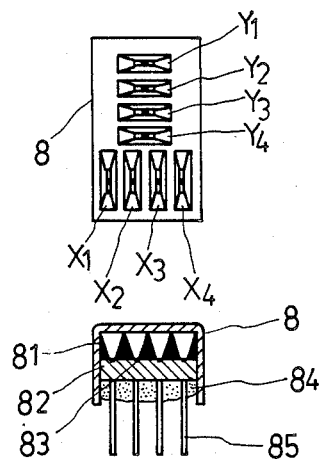
FIG. 3 is a top view and a side cross sectional view of the receiver according to the present invention.

FIG. 3 is a top view and side cross sectional view of the receiver (8) according to the present invention. On the receiver (8) there are four sets of optical grids arranged in horizontal direction and another four sets in perpendicular direction. That corresponding to the Y-axis in FIG. 1 are designated as Y1, Y2, Y3 and Y4, and that corresponding to the X-axis are designated as X1, X2, X3 and X4. Within each optical grid there is a convergent seat (81), a wafer support (82), a wafer (83), resin (84) and conducting wires (85).

Figure 4:
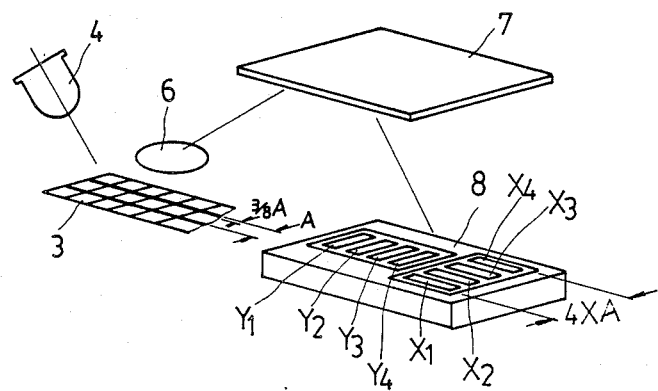
FIG. 4 is a perspective view illustrating operation of the present invention.

FIG. 4 illustrates operation of the present invention. Suppose the pitch between two consecutive lines on the reflection plane is P, and the width of each line is $\frac{3}{8}$ A. Then, by precise computation, appropriate selection of lens (6) and positioning of the reflector (7), light reflected from each pitch (including $\frac{3}{8}$ of which representing light portion and $\frac{3}{8}$ representing dull portion-light to the line will be absorbed and not reflected, then it becomes a dull portion) is amplified by the lens and reflected by the reflector (7) to cover all the optical grids on the corresponding axis. In other words, movement for a pitch in X-axis direction will cause the shadow portion form by the lines to pass through all optical grids X1, X2, X3 and X4 on the X-axis. In application of the embodiment described hereof, whenever a shadow is passing through a optical grid, wafer (83) in the optical grid, please refer to FIG. 3, give a High output through the conductive wire (85) if no light is received. However, on the displacement in the aforesaid X-axis direction, optical signals representing brightness and shadow appear at the optical grids Y1, Y2, Y3 and Y4 of the Y-axis simultaneously. Therefore, unlike the optical grids X1, X2, X3 and X4, optical grids of the Y-axis do not give "High" output in order, and displacement in the X-axis direction can be detected precisely without affecting operation of the Y-axis. Distance of displacement can be computed from number of shadows passing through the optical grids, and the direction of displacement, left and right, can be determined by the order of optical grids passed, X1-X2-X3-X4 or X4-X3-X2-X1.

Figure 5:
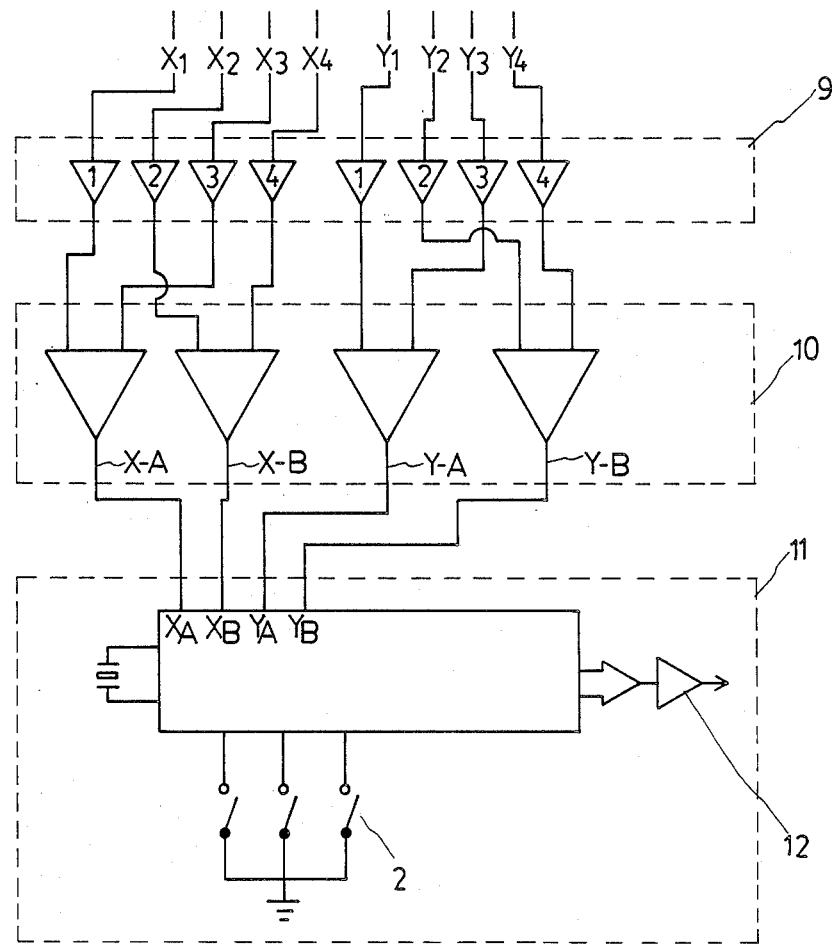
FIG. 5 shows an electronic signal processing system according to the present invention.

FIG. 5 is a electronic signal processing system, according to the present invention. Electronic signals generated by the optical grids X1, X2, X3, X4, Y1, Y2, Y3 and Y4 go via eight channels to an amplifier for amplification, an EXC-OR GATE rectifier circuit (10) and then a micro-processor for processing. The function keys (2) are for selection of function. Data acquired are sent to computer by an interface driver (12) in accordance with RS-232, the principle of communications to control movement of cursor. In the EXC-OR GATE rectifier circuit (10), output signal X-A represents data from comparison between X1 and X3, X-B represents that from X2 and X4. Because the width of shadow is 3/2 times of the width of optical grid ($\frac{3}{8}$ A×4=3/2 A), the phase difference between X-A and X-B is 90 degree, and thus signals will be comfused. The same conditions occur at the Y-axis too.

I claim:

1. An optical cursor control comprising:
a reflection plane with parallel lines of constant width and pitch on its surface in horizontal and perpendicular directions of a definite ratio to reflect light;
a light source, lens, reflector and receiver to transmit light in the form of an image to the said reflection plane and reflect light therefrom, amplify it and transmit it, said receiver adapted to receive the image from said reflector,
said receiver having a plurality of mutually spaced optical grids disposed in horizontal and perpendicular directions, each of the optical grids having a wafer in the bottom thereof to give corresponding High and Low output signals upon receipt of bright light and shadow the image covering all grids and defining 3/2 of the pitch in the horizontal and perpendicular directions the optical grids on said receiver in a horizontal direction adapted to provide an electronic signal in response to change of light from horizontal displacement of the light source, and the optical grids on said receiver in a perpendicular direction adapted to provide an electronic signal in response to change of light from perpendicular displacement of the light source on the reflection plane; and electronic signal processing means for receiving signals from said grids and amplifying, rectifying and computing to determine distance and direction of displacement and for controlling movement of a cursor responsive thereto.

* * * * *